United States Patent [19]

Garfinkle

[11] Patent Number: 5,269,657
[45] Date of Patent: Dec. 14, 1993

[54] AERODYNAMICALLY-STABLE AIRFOIL SPAR

[76] Inventor: Marvin Garfinkle, P.O. Box 15855, Philadelphia, Pa. 19103

[21] Appl. No.: 780,807

[22] Filed: Oct. 22, 1991

Related U.S. Application Data

[63] Continuation-in-part of Ser. No. 556,299, Jul. 20, 1990, abandoned.

[51] Int. Cl.$^5$ .............................................. B64C 11/26
[52] U.S. Cl. ..................................... 416/226; 416/230; 416/241 R; 29/889.71; 244/124
[58] Field of Search ................... 416/225, 226, 229 R, 416/230 R, 230 A, 241 R, 134; 244/123, 124; 29/889, 889.7, 889.71

[56] References Cited

U.S. PATENT DOCUMENTS

| | | | |
|---|---|---|---|
| 2,514,888 | 7/1950 | McFarland | 244/123 |
| 3,028,292 | 4/1962 | Hinds | 416/241 A X |
| 3,713,753 | 1/1973 | Brunsch | 244/123 X |
| 3,768,760 | 10/1973 | Jensen | 244/123 |
| 3,962,506 | 6/1976 | Dunahoo | 244/124 X |
| 4,031,289 | 9/1977 | Adamson | 416/230 X |
| 4,037,988 | 7/1977 | Laird | 416/226 X |
| 4,098,559 | 7/1978 | Price . | |
| 4,232,844 | 11/1980 | Sobey | 244/123 |
| 4,389,162 | 6/1983 | Doellinger et al. | 416/229 A X |
| 4,627,791 | 12/1986 | Marshall | 416/230 X |
| 4,741,943 | 5/1988 | Hunt | 244/123 X |

Primary Examiner—Edward K. Look
Assistant Examiner—Christopher M. Verdier

[57] ABSTRACT

A structural spar is provided that provides beneficial flexural-torsional coupling to an airfoil so that flexural excursions of the airfoil induces torsion in the spar so as to change the pitch angle of the airfoil in such a manner as to the oppose the flexure, thereby ameliorating the excursion.

27 Claims, 9 Drawing Sheets

Conventional Airfoil

Conventional Airfoil

Conventional Airfoil

Stable Airfoil

Stable Airfoil

Stable Airfoil

Conventional Rotor

Stable Rotor

Conventional Spar

Stable Spar

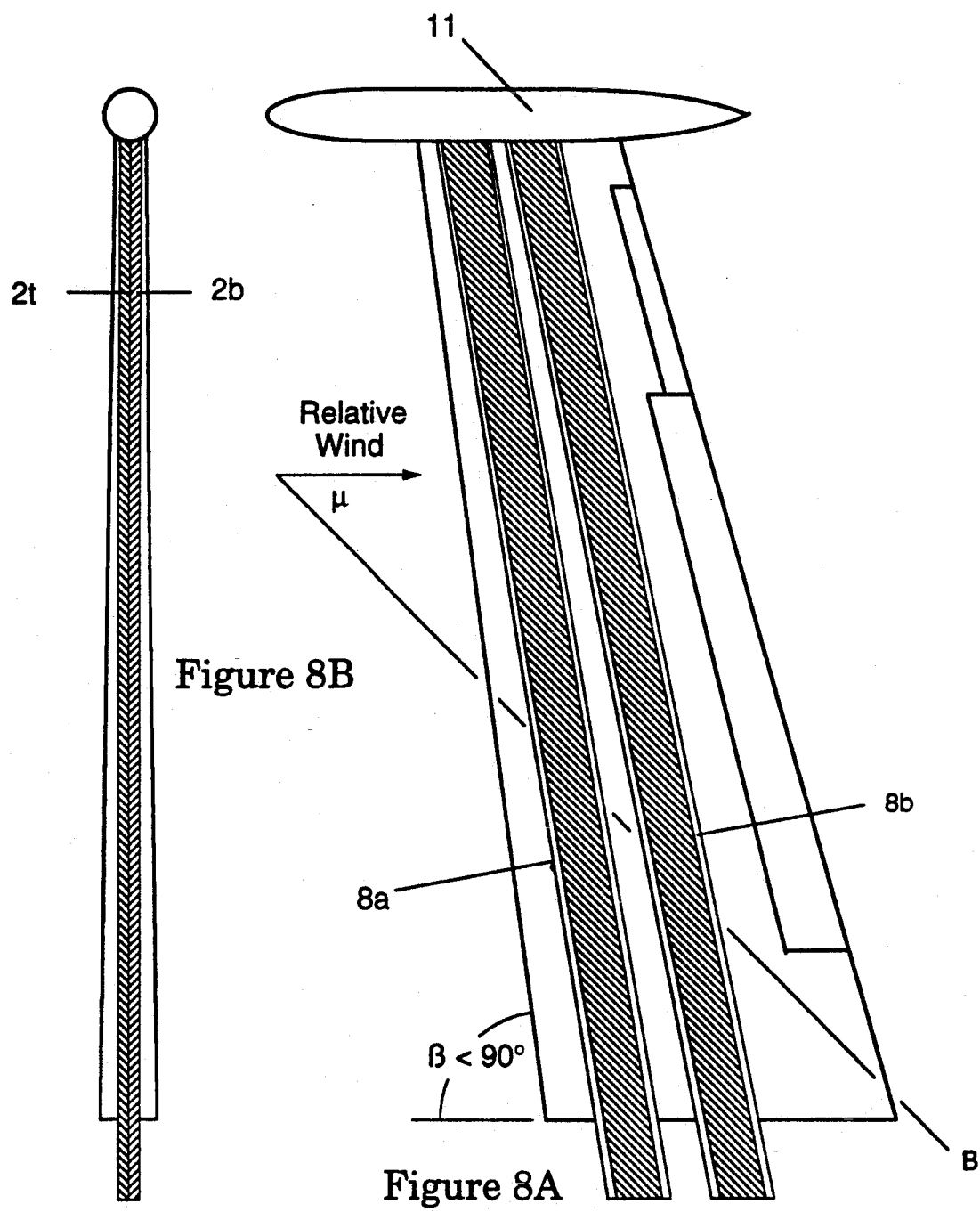
Figure 8B
Figure 8A
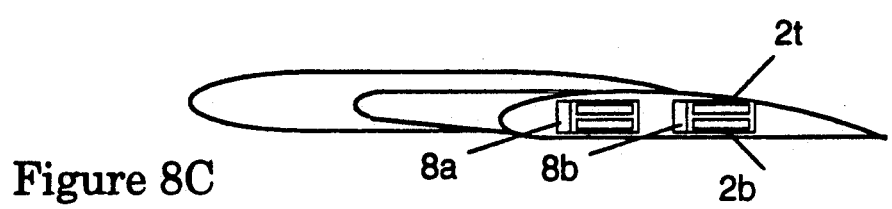
Figure 8C

AERODYNAMICALLY-STABLE AIRFOIL SPAR

This application is a continuation-in-part of U.S. patent application Ser. No. 556,299, filed on Jul. 20, 1990, now abandoned.

BACKGROUND OF THE INVENTION

Cantilevered airfoils, particularly those with high aspect ratios, are generally soft in torsion. Because the chordwise position of the center-of-fit is dependent on pitch angle, a lack of torsional stiffness can lead to oscillations in bending arising from non-uniform aerodynamic loading encountered during ostensibly normal flight maneuvers, both for fixed-wing and rotary-wing aircraft. The magnitude of such instabilities depend both on aeroelastic and aerodynamic factors, and can range from the imperceivable to the destructive, and are further accentuated if significant tip-weight is present, such as arising from armament, fuel tanks, or lift engines.

A common form of such instabilities is flutter which primarily manifests itself as wing tip or rotor tip oscillations in bending and torsion. In terms of aeroelastic factors, the amplitude of such bending excursions is inversely proportional to airfoil stiffness in torsion and flexure. In terms of aerodynamic factors, the amplitude of such bending excursions is dependent on airfoil section and thickness ratio, pitch angle and sweep angle. Moreover, the amplitude increases with increasing airspeed, becoming pronounced at airspeeds approaching sonic.

If the bending excursion results in structural twist that tends to increase the magnitude of the excursion, such as an upwards bending resulting in an increase in tip pitch angle, then the effect is destabilizing in regard to flutter oscillations, whether the aerodynamic loading is uniform or non-uniform. It follows therefore that an upwards bending accompanied of a decreasing tip pitch angle would lead to static stability, and would probably ameliorate dynamic stability, depending on the frequency and amplitude of the oscillations. If an airfoil bending excursion through section angle $d\Delta$ results in a change in airfoil twisting through section angle $d\alpha$ then the airfoil exhibits torsional-flexural coupling; $d\alpha/d\Delta \neq 0$. Accordingly, if $d\alpha/d\Delta > 0$ the airfoil is statically unstable. Only if $d\alpha/d\Delta < 0$ is the airfoil stable. The structural consideration that influence this coupling must now be considered.

In general, conventional airfoil construction can be considered isotropic, with the flexure moduli essentially identical in all directions. Consequently the axis about which preferential bending occurs is normal to the shortest dimension (thickness) and in a direction that intersects the shortest chordwise extent of the airfoil, and will be denoted the normal bending axis.

As is illustrated in FIGS. 1A, 1B and 1C for conventional airfoil construction, the relationship between the axis of bending B and the resulting change in the pitch angle depends largely on the angle between the relative wind and the bending axis of the airfoil, which will be denoted $\mu$. When the axis of bending B is the normal axis $B_o$ then $\mu = \mu_o$. All angles are positive when measured clockwise from the relative-wind direction. From geometric considerations $$d\alpha/d\Delta = -\sin(\mu). \tag{1}$$

The orientation of the normal bending axis $\mu^*$ can now be directly related to the airfoil sweep angle $\beta$ by the relationship $$\mu_o = \beta - 90°. \tag{2}$$

For rearward swept wings $\beta > 90°$ and therefore $d\alpha/d\Delta < 0$. Accordingly upward bending through an angle $\Delta$ results in downward pitching through an angle $\alpha$. Thus rearward sweep is stabilizing.

For non-swept wing $\beta = 90°$ and therefore $d\alpha/d\Delta = 0$. Nevertheless, particularly for high-aspect ratio non-symmetrical airfoils bending can result in pitch instability inasmuch as center of lift shifts with angle of attack.

For forward swept wings $\beta < 90°$ and therefore $d\alpha/d\Delta \leq 0$. Accordingly upward bending through an angle $\Delta$ results in upward pitching through an angle $\alpha$. Thus forward sweep is destabilizing. Moreover, aircraft supported by such wings are longitudinally unstable (comparable to an arrow flying backwards). However, there are distinct advantages to forward sweep. Such aircraft are extremely maneuverable, a distinct advantage for high-speed military aircraft.

Despite $d\alpha/d\Delta > 0$ electronic stability augmentation systems can permit stable flight by minutely adjusting control surfaces to dampen longitudinal excursions to the point where such excursions are essentially imperceptible. Nevertheless, bending instabilities can greatly complicate artificial stabilization, as such instabilities tends to adjust the entire airfoil to amplify such excursions, counteracting the effect of stability augmentation. To minimize such excursions swept-forward wings are constructed sufficiently stiff to hold such excursions to an acceptable level. The penalty of this brute-strength approach is excessive wing weight. Accordingly, the stability of an essentially isotropic airfoil for which $\mu = \mu_o$ is directly related to its sweep angle.

Rotor blades, having extreme aspect ratios, and being subject to periodically varying air loads, can be particularly susceptible to oscillations, as shown in FIG. 1D. Such blades operate in a highly non-uniform air-flow field. Not only must rotor blades operate through an extreme range of angles-of-attack in alternately passing through the advancing and retreating portions of the rotor disc, but each flies in the wake of the preceding rotor blade. Flutter amplitudes can reach unacceptable levels as advancing blade tips approach sonic speed. As in the case of swept-forward wings, the present procedure to minimize such instabilities depend not only on tip design but on the brute-strength approach: blades sufficiently stiff to hold flutter amplitudes to acceptable levels. In addition wind gusts can amplify the effect of the instabilities discussed. Because $\beta = 90°$ and therefore $d\alpha/d\Delta = 0$ such oscillations are not readily diminished.

Consider now an alternative approach. It would be possible to diminished bending instability if the bending axis could be skewed so that $\mu > \mu_o$, introducing beneficial torsional-flexural coupling in an airfoil despite the sweep angle. Accordingly, from equation (2) only the condition $$\mu > \beta - 90° \tag{3}$$

would have to be met. That is, preferential bending would occur not about the normal bending axis $\mu = \mu_o$ as shown in FIGS. 1A, 1B, 1C and 1D, but rather about a skewed axis $\mu \neq \mu_o$ of greater length as shown in FIGS. 2A, 2B, 2C and 2D for a stable airfoil, although both bending axes are still axes that are normal to the shortest dimension of the structure. With $\mu > \mu_o$ the coupling $d\alpha/d\Delta$ can be made independent of sweep angle $\beta$.

To construct an airfoil whose bending axis is skewed from its normal bending axis requires a construction in which the flexural modulus of the spar (longitudinal load-bearing member) of the airfoil can be controlled in different directions relative to the longitudinal axis of the spar. This requirement can ostensibly be met using filament reinforced composite construction. Either essentially unidirectional resin-preimpregnated filaments (prepreg) or a fabric with preferred filament-orientation that is resin-impregnated after lay-up is wound about a non-structural core. A unidirectional filament layer is denoted a ply. Adjacent plies in the same direction are denoted parallel plies and adjacent plies in different directions are denoted cross plies. Adjacent plies 90° to one another are denoted orthogonal plies.

Upon curing of the composite the resin bonds the plies into a unitary spar in which the orientation of the flexure axis greatly depends on the preferred angular orientation of the filaments relative to the longitudinal axis of the spar. This composite spar comprises the load-bearing member of the airfoil.

Because the tensile modulus of filament-resin composite construction in the direction parallel to the filament is perhaps 25 times greater than that in the transverse direction, composite structures can be highly anisotropic, depending on the stacking sequence of the plies, using roughly the rule of mixtures. This possible effect is illustrated in FIGS. 3A, using a filament laid down about a conventional core as an example.

Ostensibly the orientation of the ply laid over the upper surface of the core at helical angle $\theta_U$ to the longitudinal axis of the core should result in a preferred bending axis $B_U$ skewed from the normal bending axis $B_o$. However, the ply laid over the lower surface of the core is oriented at the opposite helical angle of $\theta_L$ from the longitudinal axis, which will result in a preferred bending axis $B_L$ oppositely skewed from the normal bending axis $B_o$. consequently, because the filaments are conventionally laid $\theta_U + \theta_L = 0$, and therefore the bending axes $B_U$ and $B_L$ cross. Accordingly, the effect of skewing the bending axes is lost. As a result the skewed bending axes shown in FIGS. 2A, 2B, 2C and 2D cannot be realized with conventional composite construction using multiple parallel plies. Multiple orthogonal plies will not alter this situation as such ply would simply alternate the bending axes $B_U$ and $B_L$.

| OBJECTIVE OF THE INVENTION REFERENCES | | |
|---|---|---|
| M. Garfinkle | DD 200,111 | 29 Aug 88 |
| J. Hunt | US 4,741,943 | 03 May 88 |
| A. C. Marshall | US 4,627,791 | 09 Dec 86 |
| R. Doellinger et al | US 4,389,162 | 21 Jun 83 |
| J. L. Price | US 4,098,559 | 04 Jul 78 |
| A. P. Adamson | US 4,051,289 | 27 Sep 77 |
| G. W. Laird | US 4,037,988 | 26 Jul 77 |
| E. O. Dunahoo | US 3,962,506 | 08 Jun 76 |
| L. C. Jensen | US 3,768,760 | 30 Oct 73 |
| K. Brunsch | US 3,713,753 | 30 Jan 73 |
| M. Neubert | Ger 1,531,369 | 15 Jan 70 |
| J. A. Hinds | US 3,028,292 | 3 April 62 |
| W. Hofmann | Ger 1,036,064 | 7 Aug 58 |
| D. L. McFarland | US 2,514,888 | 11 Jul 50 |

OBJECTIVE OF THE INVENTION

The objective of the invention disclosed herein is to permit filament lay-up (or preferred-orientation tape lay-up) about a core in such a manner that the helical angle of multiple parallel plies on opposite sides of the spar are identical so that $\theta_U - \theta_L = 0$ rather than $\theta_U + \theta_L = 0$ as in conventional practice, thereby providing composite construction with beneficial torsional-flexural coupling.

For example, the convex side of a spar subject to a bending load is in tension while the opposite concave side is in compression. The magnitude of this compressive and tensile load increases with distance in opposite normal directions from a specific plane denoted the neutral plane, which is subject to essentially zero bending load, as the bending axis lies on the neutral plane. Thus, the upper plies of the laid down core shown in FIG. 3A, if on the convex side of the core, would be under tension while the lower plies on the concave side of the core would be under compression.

The transverse center plane of the core would not be loaded, and consequently is the neutral plane. If this core were sectioned along the neutral plane and each section laid down separately, as illustrated in FIGS. 3B, then essentially the multiple parallel plies laid along the neutral plane of this sectored-core would not be subject to any bending load.

According to the disclosed invention, with the parallel plies laid down in opposite helical directions, the unidirectional plies would be mirror images relative to the neutral plane which may comprise the juncture of the two core sections that comprise the sectored core. As a result a spar comprising the assembled sectored-core would have the same preferred bending axes $B_U - B_L = 0$, as shown in FIGS. 3B, Consequently, the actual bending axis B of the spar, comprising two core sections with mirror image plies and therefore parallel preferred bending axes, would be skewed from its normal bending axis B°, resulting in $\mu \neq \mu°$, thereby permitting the conditions of Expression (3) to be met so as to impart beneficial torsional-flexural coupling on an airfoil.

Accordingly, upon a bending excursion of the composite spar about its skewed bending axis B the pitch angle of the spar would change in the opposite direction, inducing an aerodynamic load on the spar in the opposite direction of the excursion to restore airfoil stability. Moreover, because the unidirectional parallel plies about the dual core-sections are mirror-images, the imparted torsional-flexural coupling does not directly contribute to secondary adverse coupling such as the tension-torsion coupling to which rotors and propellers can be susceptible.

Fortunately, such an aerodynamically-stable composite spar can be fabricated using conventional techniques. FIG. 4A illustrates the winding of a sectored core using a conventional winding machine. However, rather than the direction of rotation of the core remaining fixed as in conventional practice as the filament, prepreg or tape feeding head reverses its longitudinal direction at the end of its travel, instead the direction of rotation reverses as the longitudinal direction reverses. Consequently the filaments retrace their path, resulting in multiple parallel plies rather than cross-plies as in conventional practice. Such a procedure requires that the winding be clamped at the end of the feeding head travel. For the opposite sectored-core the direction of winding would be reversed.

FIG. 4B illustrates a braiding technique to fabricate an aerodynamically-stable spar. The sectored core is differentially braided, with high-modulus yarns all wound in one direction, the direction required to skew the bending axis. Low modulus yarns that are wound in the opposite direction serve only to maintain the position of the high-modulus yarns. For the opposite sectored-core the direction of braiding would be reversed.

BRIEF DESCRIPTION OF THE DRAWINGS

FIG. 8A illustrates a top view of a swept-forward stable wing.

FIG. 8B illustrates an edge view of a swept-forward stable wing.

FIG. 8C illustrates an end view of a swept-forward stable wing.

Filament, prepreg and cloth characteristics, resin properties and curing conditions are not discussed as these are conventional and known to those skilled in the art of composite construction.

PREFERRED EMBODIMENT OF THE INVENTION

Figures 5A, 5B, 5C:
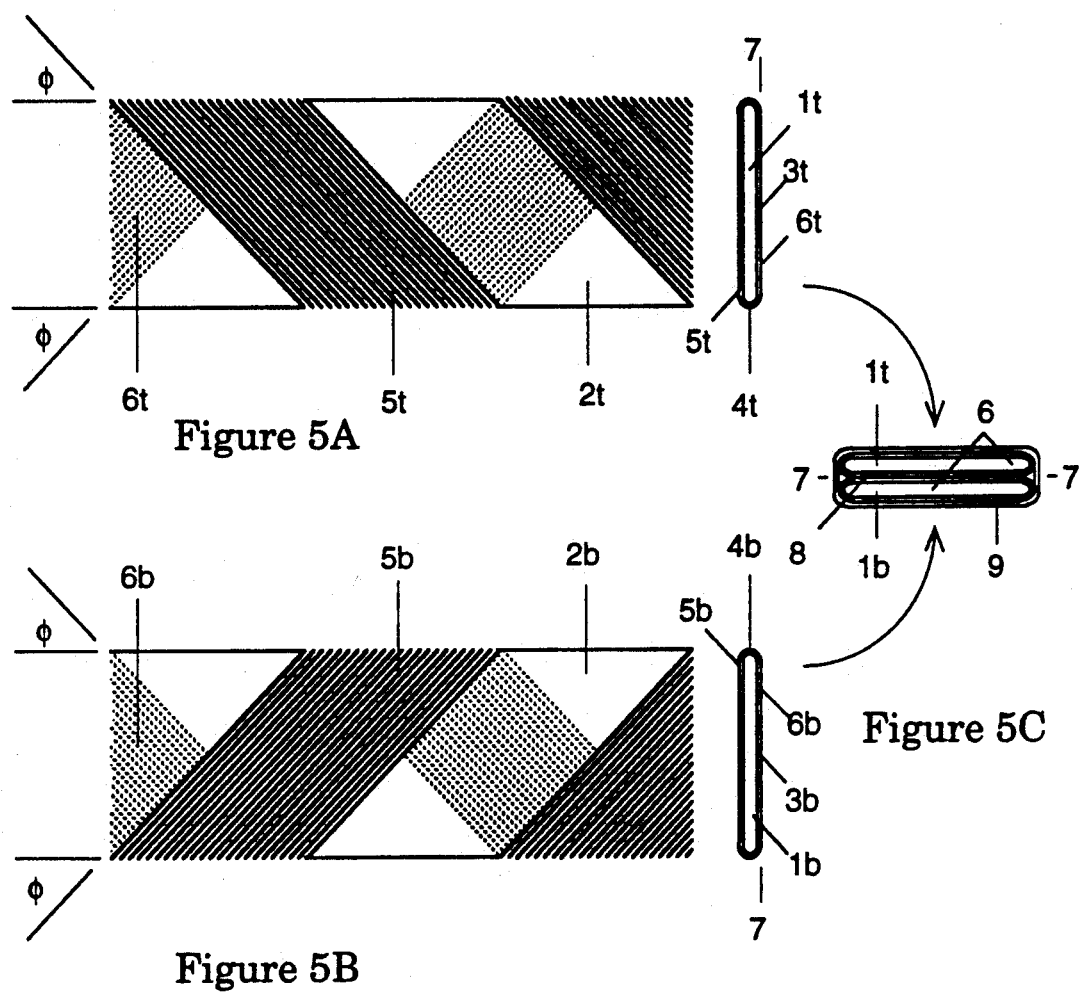
FIG. 5A illustrates an upper core-section with a single unidirectional filament layup.
FIG. 5B illustrates a lower core-section with a single unidirectional filament layup.
FIG. 5C illustrates a symmetric structural spar comprising upper and lower core-sections.

FIGS. 5A and 5B illustrate the upper core-section 1$t$ and lower core-section 1$b$, respectively of a structural spar. Core-sections 1$t$ and 1$b$ with essentially identical cross-sections each have outer surfaces 2$t$ and 2$b$ and inner surfaces 3$t$ and 3$b$, respectively. The latter surfaces 3$t$ and 3$b$ designating the surfaces to be joined along neutral plane 7 to form the fabricated structural spar 8. The helically-disposed parallel plies 4$t$ unidirectionally wrapped about upper core-section 1$t$ are identified as parallel plies 5$t$ on the outer surface 2$t$ of core-section 1$t$ and as parallel plies 6$t$ on the inner surface 3$t$. In an equivalent manner, the helically-disposed parallel plies 4$b$ unidirectionally wrapped about lower core-section 1$b$ is identified as parallel plies 5$b$ on the outer surface 2$b$ of core-section 1$b$ and as parallel plies 6$b$ on the inner surface 3$b$.

For the preferred bending axis of upper core-section 1$t$ to be the same as that of lower core-section 1$b$ after the inner surfaces 3$t$ and 3$b$ are joined to form the final spar 8, the orientation of multiple parallel plies 5$t$ and 5$b$ before the core-sections 1$t$ and 1$b$ are joined along neutral plane 7 must be mirror-images as illustrated and can be applied by winding, differential braiding, or other means know to those knowledgeable in the art. The number of plies and the helical angle $\phi$ are dictated by the desired angle $\mu$ between the relative ply direction and the bending axis of the airfoil. However, because multiple plies 6$t$ and 6$b$ have finite thickness they are slightly displaced from the neutral plane 7, and consequently will somewhat moderate the beneficial effect of parallel plies 5$t$ and 5$b$ on torsional-flexural coupling, with the result that $\mu \leq \phi$.

As illustrated in FIG. 5C, after assembly of core-sections 1$t$ and 1$b$ along neutral plane 7 into structural spar 8, spar 8 can be orthotropically wrapped in the conventional manner 9 as known to those skilled in the art, such as by winding or braiding, to provide the structural requirements of spar 8. Accordingly, the mirror-image parallel plies 5$t$ and 5$b$ on core sections 1$t$ and 1$b$ respectively serve solely to skew the bending axis of spar 8 to the desired angle $\mu$.

Figure 6A:
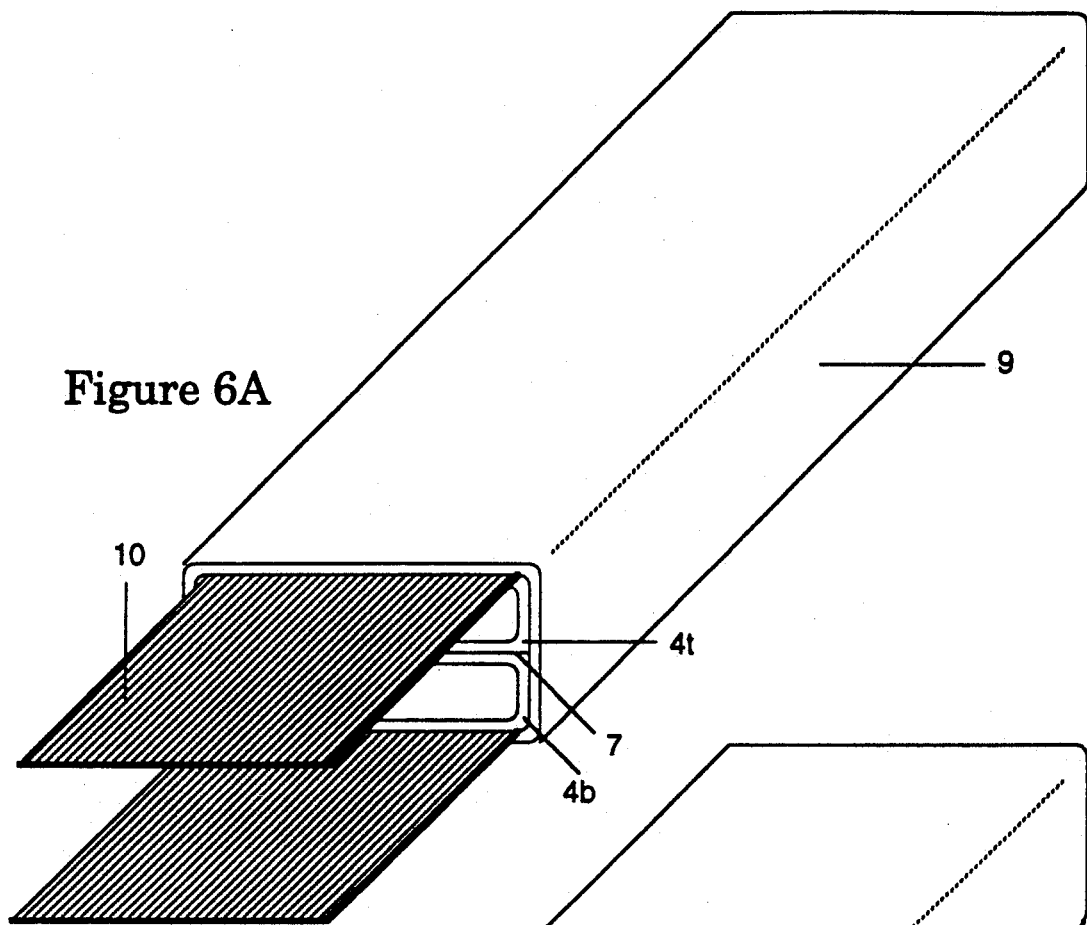
FIG. 6A illustrates an aerodynamically-stable spar with longitudinal plies positioned for maximum longitudinal rigidity.
Figure 6B:
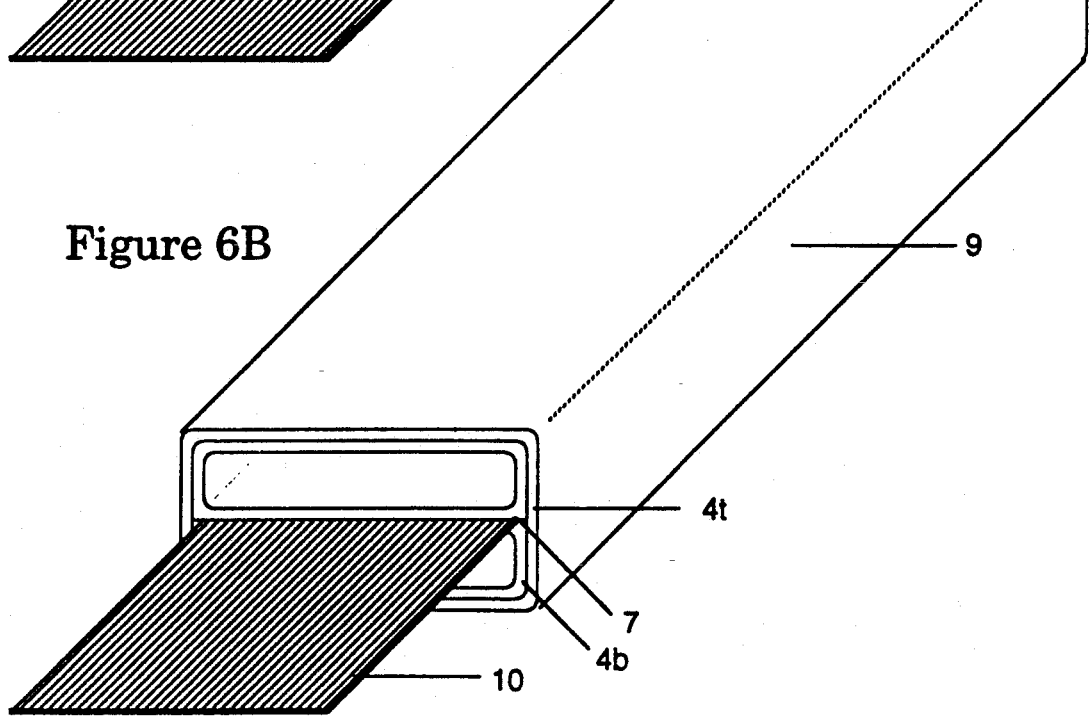
FIG. 6B illustrates an aerodynamically-stable spar with a longitudinal ply positioned for minimum longitudinal rigidity.

The stiffness of an aerodynamically-stable spar can be readily tailored by the placement of longitudinal plies 10 as illustrated in FIGS. 6A and 6B. FIG. 6A shows a highly rigid construction as would be applicable to fixed-wing spars, with the longitudinal plies 10 displaced from the neutral plane 7 and secured by wrapping 9. FIG. 6B shows a less rigid construction as would be applicable to rotary-wing spars, with a longitudinal ply 10 on the neutral plane 7.

Figure 1A:
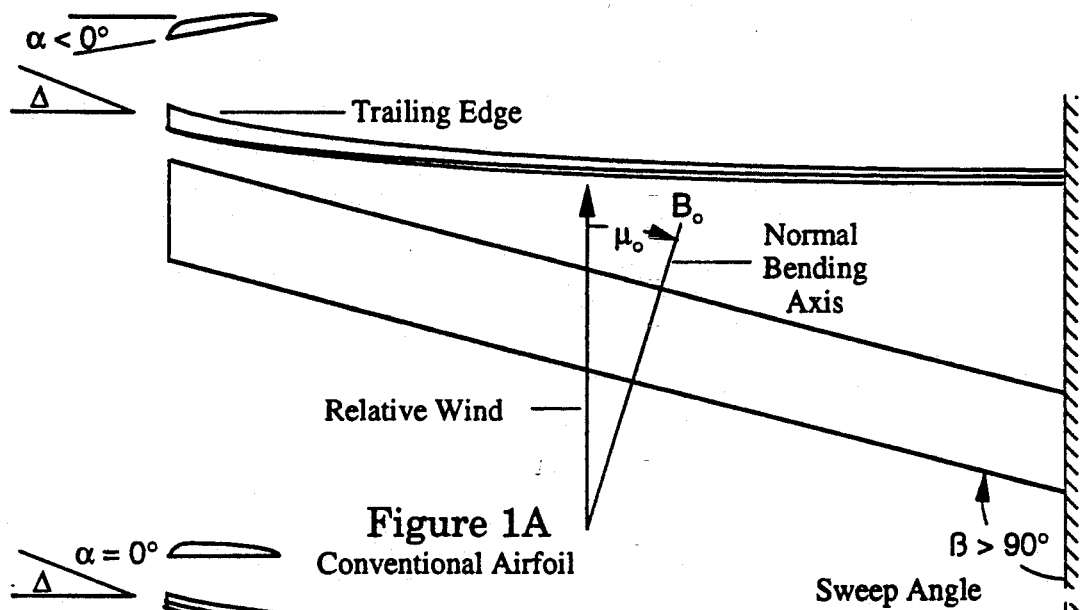
FIG. 1A illustrates a rearward swept conventional airfoil subject to bending about its normal bending axis.
Figure 1B:
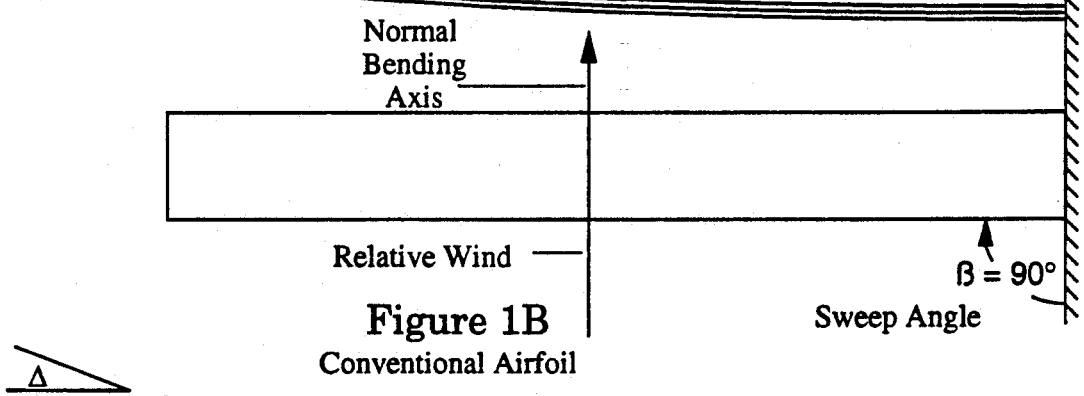
FIG. 1B illustrates a non-swept conventional airfoil subject to bending about its normal bending axis.
Figure 1C:
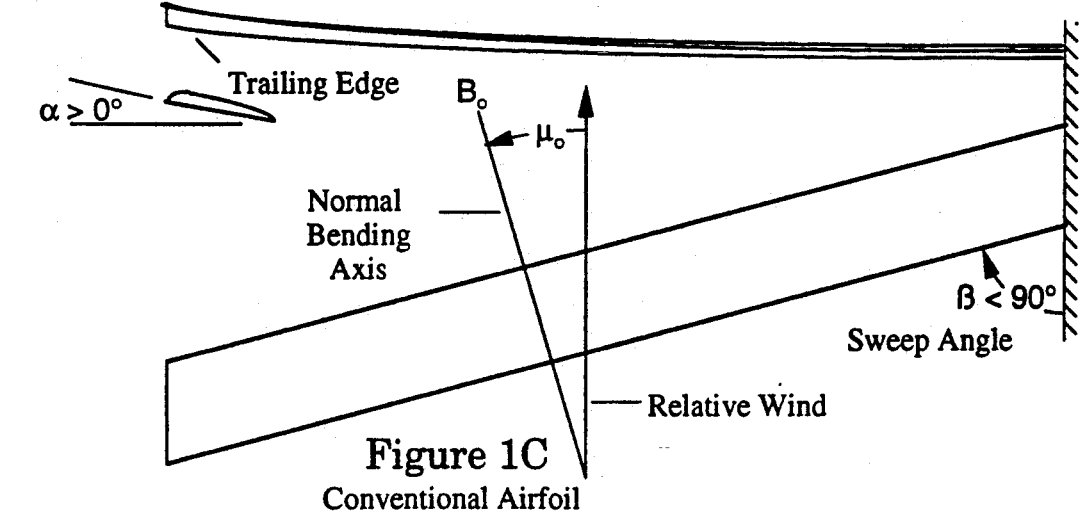
FIG. 1C illustrates a forward swept conventional airfoil subject to bending about its normal bending axis.
Figure 2A:
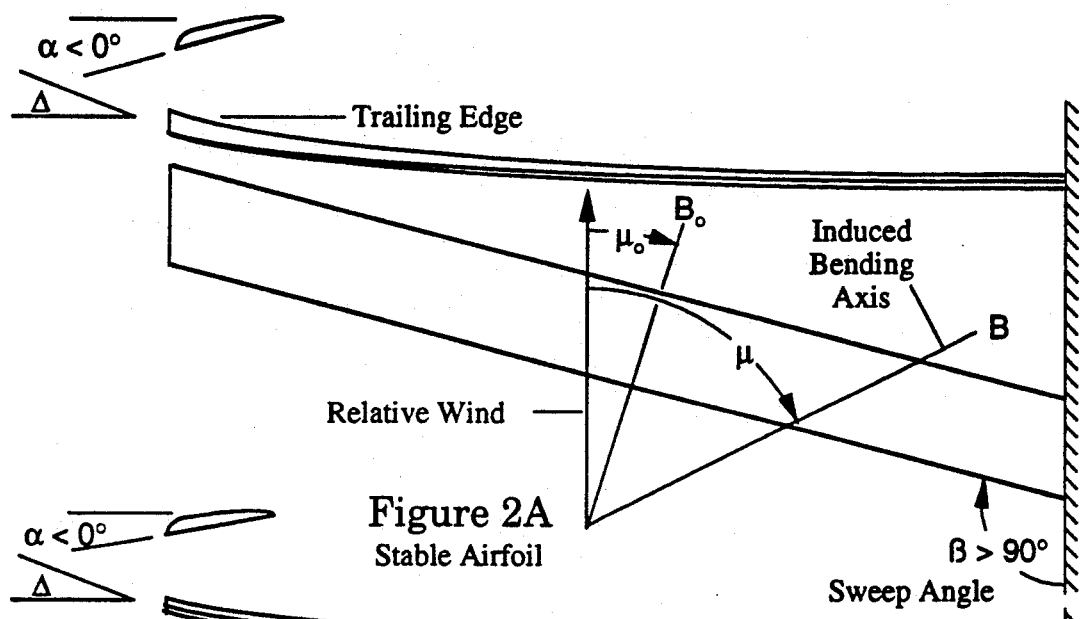
FIG. 2A illustrates a rearward swept stable airfoil subject to bending about a skewed bending axis.
Figure 2B:
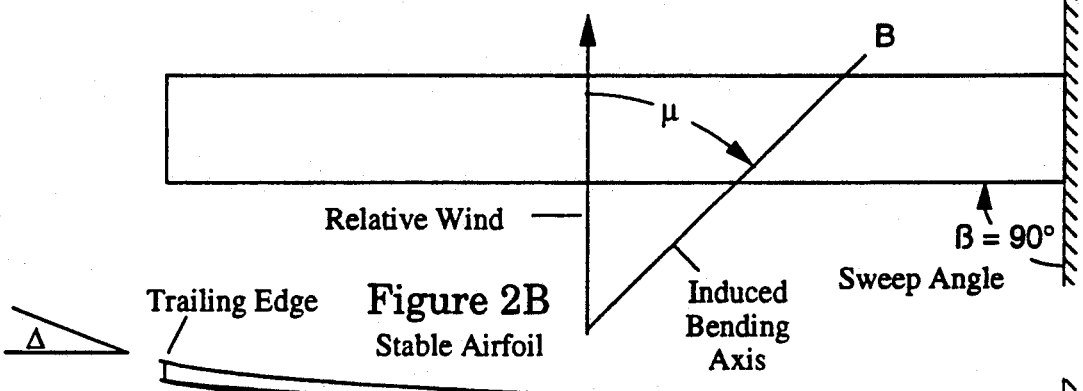
FIG. 2B illustrates a non-swept stable airfoil subject to bending about a skewed bending axis.
Figure 2C:
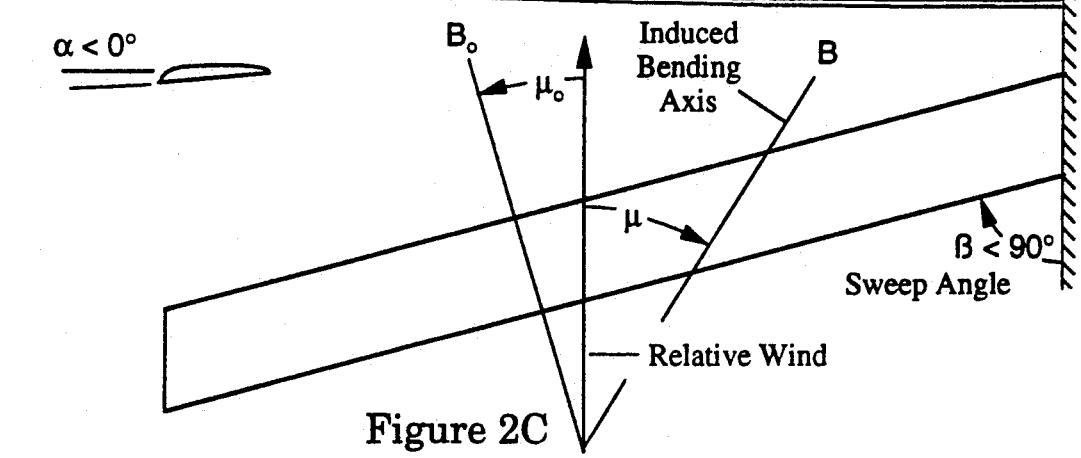
FIG. 2C illustrates a forward swept stable airfoil subject to bending about a skewed bending axis.
Figure 1D:
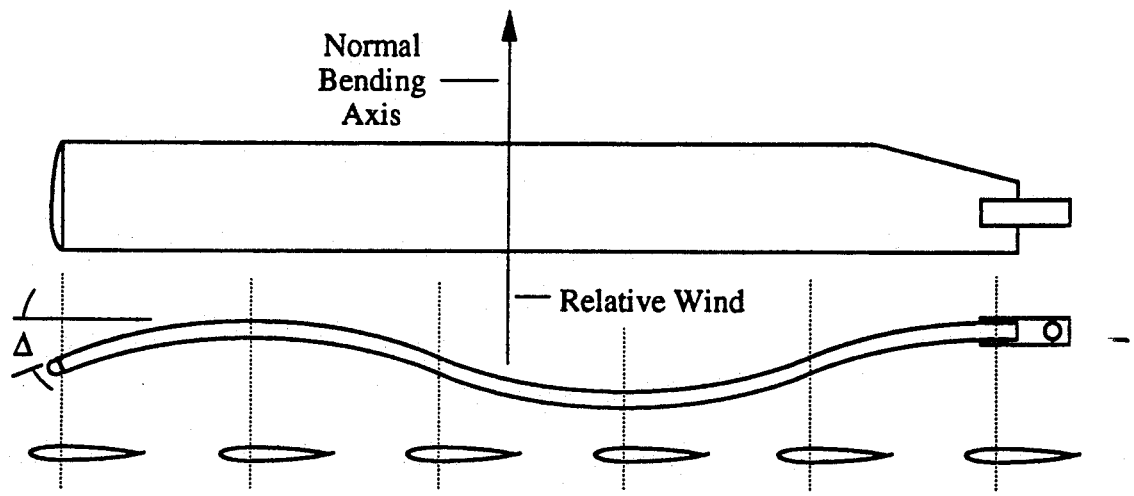
FIG. 1D illustrates a rotor blade subject to bending about its normal bending axis.
Figure 2D:
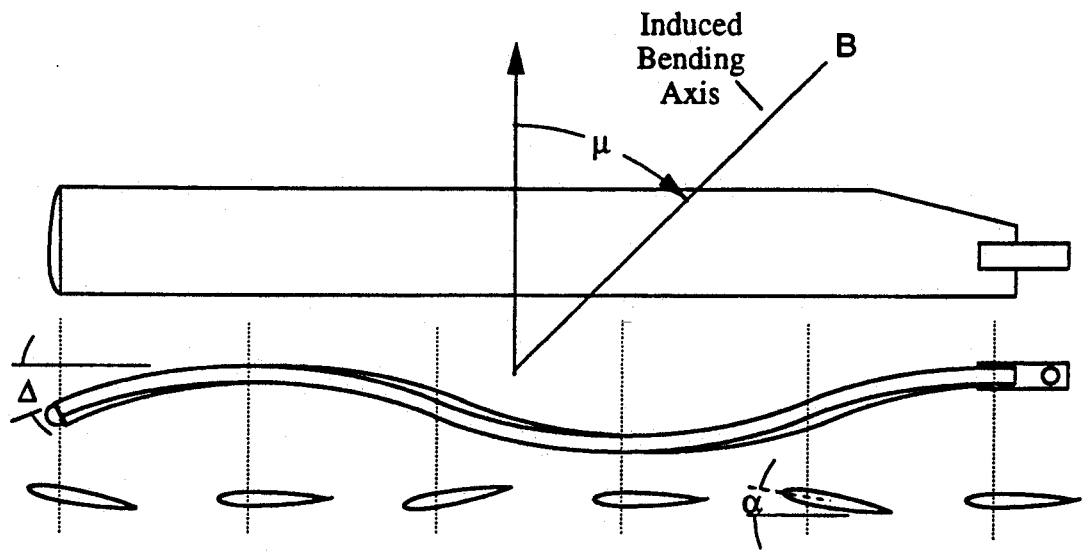
FIG. 2D illustrates a rotor blade subject to bending about a skewed bending axis.
Figure 3A:
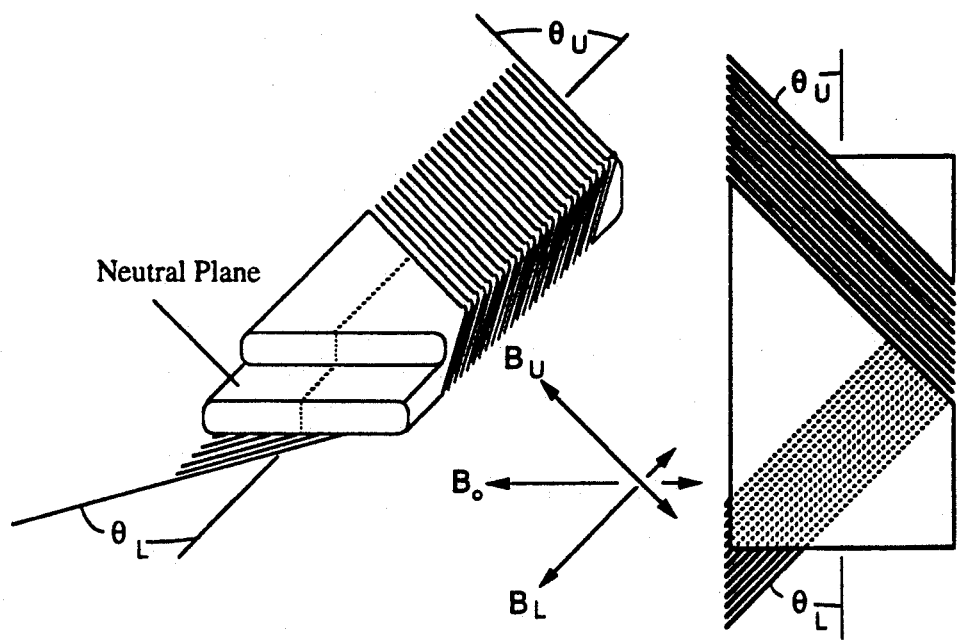
FIG. 3A illustrates the ply orientation of a conventional filament-laid conventional core.
Figure 3B:
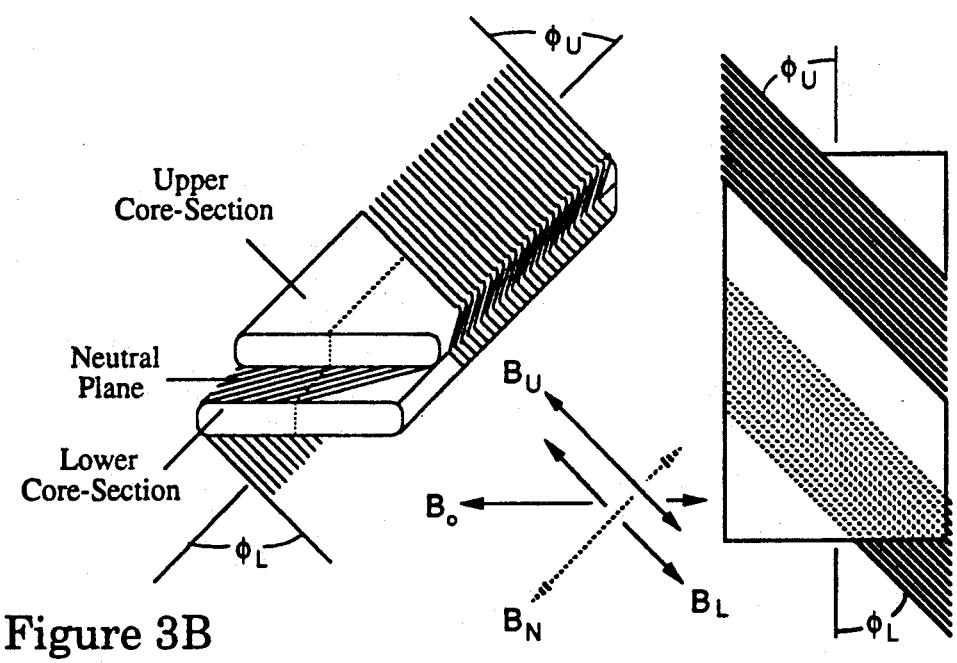
FIG. 3B illustrates the ply orientation of a symmetric filament-laid sectored-core.
Figure 4A:
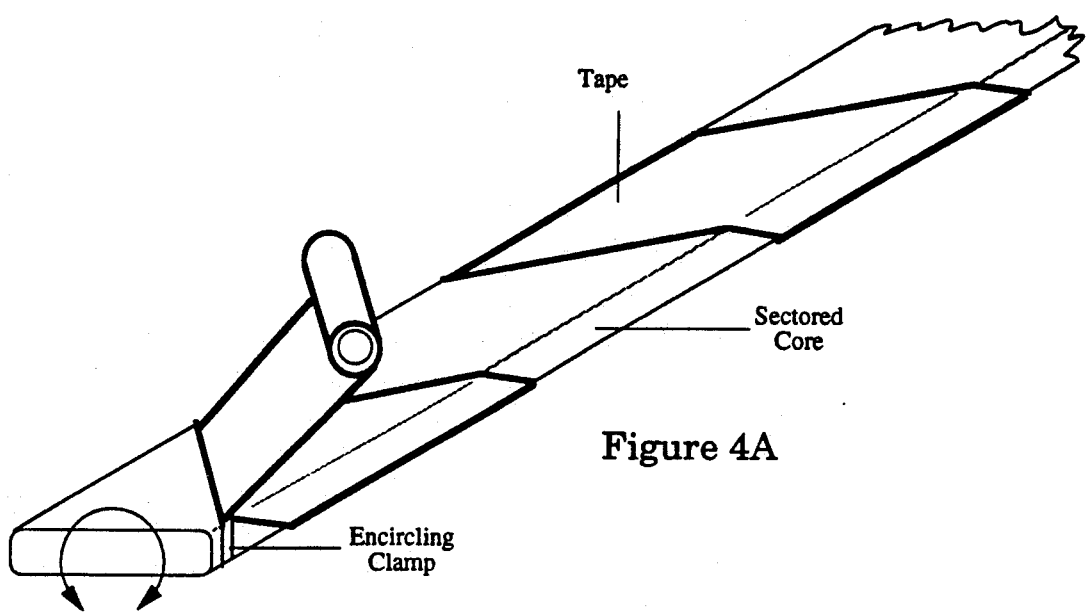
FIG. 4A illustrates spar fabrication by filament wrapping.
Figure 4B:
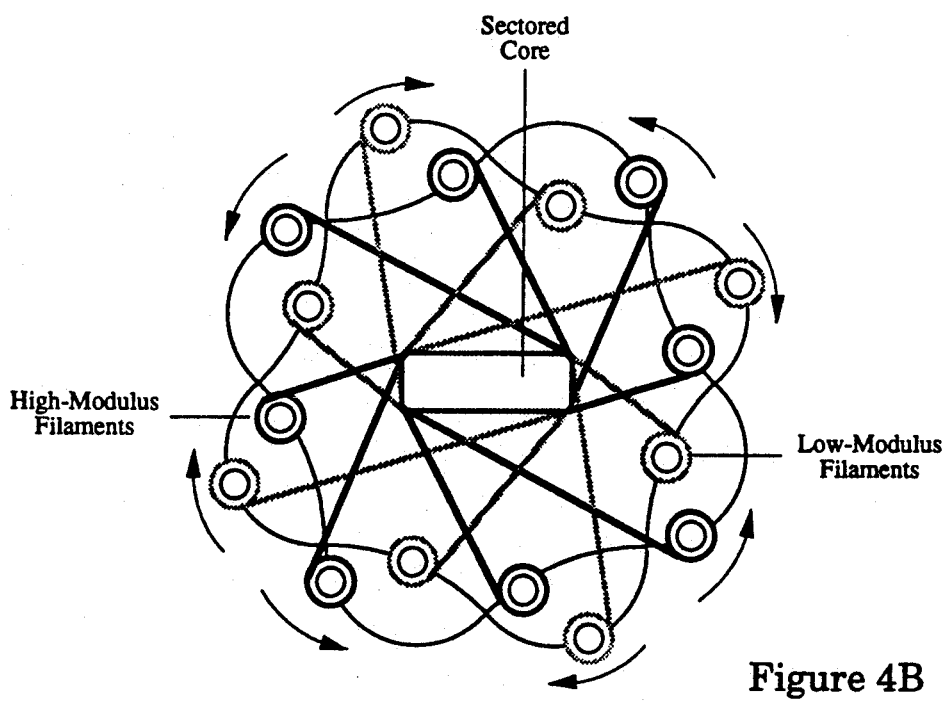
FIG. 4B illustrates spar fabrication by filament braiding.

Each sectored core 8 can be differentially braided as shown in FIG. 4B. The higher modulus braid yarn 11$a$ will behave as a high modulus winding inasmuch as the oppositely braided yarn will have a lower modulus, and hence will not have a pronounced effect on coupling, thereby yielding the required torsional-flexural coupling.

Figure 7A:
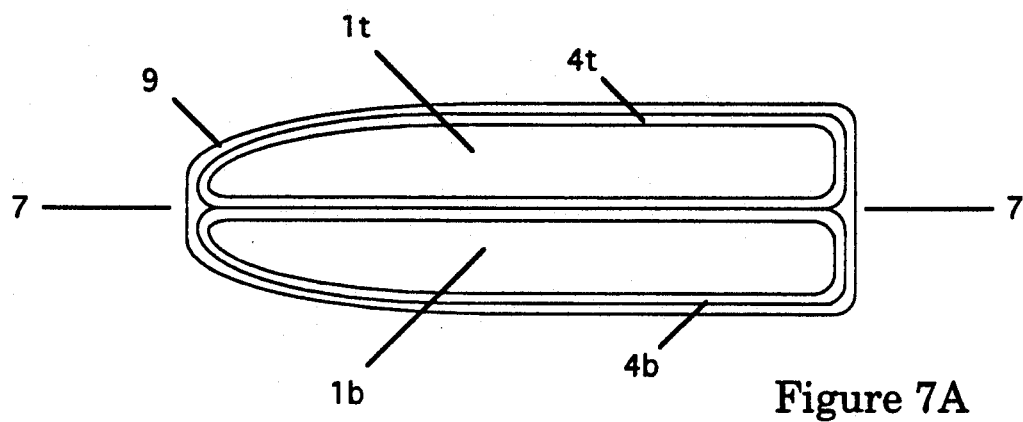
FIG. 7A illustrates a symmetric aerodynamically-stable spar.
Figure 7B:
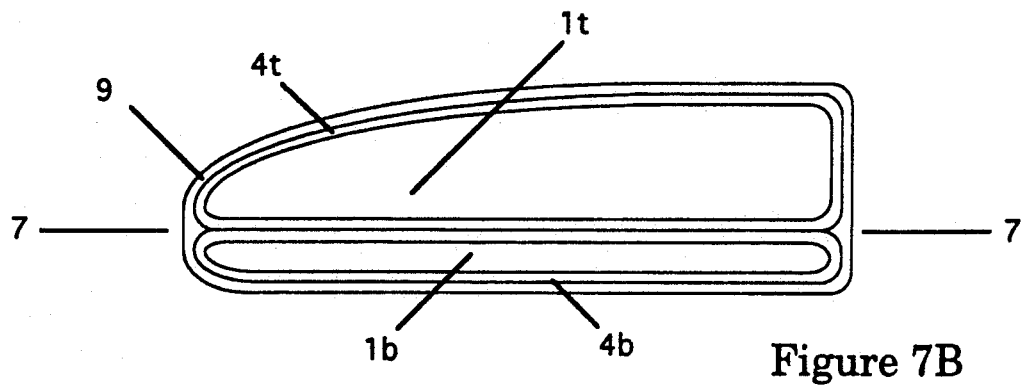
FIG. 7B illustrates a non-symmetric aerodynamically-stable spar.

Normally the position of the neutral plane 7 is centered, as shown in FIG. 7A. However, with sectored-core construction the position of the neutral plane 7 of a body subject to a bending stress can be shifted to the most advantageous position by adjusting the relative stiffness of the outer surfaces of the body, as shown in FIG. 7B for non-identical core cross-sections. Because the multiple parallel plies 4$t$ and 4$b$ are laid down separately about each sectored core 1$t$ and 1$b$, such differential stiffness can be readily provided. This differential stiffness can be effected by either providing more parallel plies about one sectored-core relative to the other or by using filament plies with different moduli. The effect would be to shift the position of the neutral plane 7 towards the outer surface with the stiffer parallel plies, for example ply 7b in FIG. 7B.

The torsional-flexural coupling provided by spar 8 would tend to diminish adverse torsional excursions of a wing with tip-weights or weapon stores by imposing out-of-phase flapping, whether the wing was swept or not. FIGS. 8A, 8B and 8C illustrate the construction of a forward-swept aerodynamically-stable wing with dual load-bearing structural spars 8a and 8b and significant tip-weight 11. Accordingly, airfoil construction lighter than conventional would be practical due to beneficial torsional-flexural coupling, even for the forward-swept wings shown, because the airfoil could be relatively aeroelastically soft, yet aerodynamically stiff, in bending. Moreover, multiple spars provide redundant load-bearing paths, a consideration important to fixed-wing and rotary-wing safety in the event a spar degradation.

In wing construction it might be advantageous to eliminate the non-structural cores 1a and 1b after layup to provide for internal fuel storage. Under these conditions, for structural support it would be necessary to interpose conventional cross plies and possibly longitudinal plies between the disposable core sections and the parallel plies 5t and 5b to support the parallel plies.

When a rotor system is subject to maneuvers severe enough to cause a blade to flap down to the extent that its root contacts the lower blade stop, the blade is generally subject to downward bending, presenting the possibility of the blade contacting the fuselage, a possibility also present during hard landings. The torsional-flexural coupling provided by spar 8 would aerodynamically oppose such an excursion by increasing the blade pitch angle.

For high-speed military aircraft, beyond ameliorating the effect of bending instability, skewing the bending axis of their wings by employing spar 8 would tend to diminish the bending loads arising from high acceleration maneuvers, particularly high-rate rolls, by adjusting the wing pitch angle to minimize the amplitude of out-board bending.

A problem associated with composite structures such as rotor blades is bend-stretch coupling which can result in structural wrapping during curing. It is known to those skilled in the art that the detrimental effect of such coupling can be eliminated by adopting a symmetrical sequence of windings, but such a sequence is not possible using a conventional core as has been discussed. However, with spar 8, the unidirectional plies are symmetrical relative to the neutral plane 7. Consequently, the unidirectional plies as disclosed in this invention cannot contribute to bend-stretch coupling.

While there have been described what is at present considered to be the preferred embodiment of a structural spar, it will be obvious to those skilled in the art that various changes and modifications may be made therein without departing from the invention. It is aimed therefore in the appended claims to cover all such changes and modifications as fall within the true spirit and scope of the invention so that others may, by applying current and future knowledge, adopt the same for use under various conditions of service.

What is claimed as the invention is:

1. In a spar of the type having a neutral plane, a normal bending axis and a longitudinal axis, the method of applying a torsional-flexural coupling to said spar after it is bent comprising the steps of creating a second bending axis which is skewed from said normal bending axis by providing at least two essentially helical windings that extend longitudinally along said spar, said essentially helical windings essentially mirror images of each other, said second bending axis being the actual bending axis of said spar, thereby when said spar is bent the bending imparts a torsional-flexural coupling about said longitudinal axis, whereupon said torsional-flexural coupling is applied over the length of said spar.

2. The method as defined in claim 1 wherein said helical windings are comprised of resin impregnated filaments, and curing said resins to bond said filaments into a unitary member.

3. The method as defined in claim 2 including the steps of providing first and second core section, and wrapping said helical windings around said sections.

4. The method as defined in claim 2 including the step of wrapping the filaments in each winding in the same direction.

5. The method as defined in claim 2 including the steps of providing both high modulus filaments and low modulus filaments, and wrapping said high modulus filaments in one direction and wrapping said low modulus filaments in the opposite direction so that said low modulus filaments retain said high modulus filaments in their positions without changing the location of said actual bending axis.

6. The method as defined in claim 2 including the step of varying the location of said neutral plane by providing helical windings of non-identical cross-section.

7. The method as defined in claim 6 wherein said step of providing helical windings of non-identical cross-section includes the step of placing a different number of filaments in the different helical windings.

8. The method as defined in claim 6 wherein said step of providing helical windings of non-identical cross-section includes the step of placing a different types of filaments in the different helical windings.

9. The method as defined in claim 1 including the step of providing an airfoil, and including said spar within said airfoil, said spar being the principal load bearing member of said airfoil so that said torsional-flexural coupling provides an aerodynamic restoring force to oppose said bending.

10. The method as defined in claim 9 wherein said airfoil is a fixed wing.

11. The method as defined in claim 9 wherein said airfoil is a rotary wing.

12. The method as defined in claim 3 including the step of removing said core sections after said resin is cured.

13. A spar of the type having a neutral plane, a normal bending axis and a longitudinal axis, said spar comprising a core having a plurality of sections, and an actual bending axis, said actual bending axis being skewed from said normal bending axis so that when said spar is bent a torsional-flexural coupling is induced about said longitudinal axis over the length of said spar.

14. A spar as defined in claim 13 including
filament plies around each of said core sections, the filaments in said plies being helically disposed and lying in essentially parallel relationship to each other, and
said core sections being joined so that said filament plies on each of said sections are a mirror image of the filament plies on the other section across said juncture.

15. A spar as defined in claim 14 wherein
said sections have non-identical cross-sections.

16. A spar as defined in claim 14 wherein
the neutral plane of said spar lies along said juncture of said sections.

17. A Spar as defined in claim 15 wherein
there are a different number of plies in each of said sections.

18. A spar as defined in claim 15 wherein
the moduli of the filaments comprising the plies on each of the sections is different.

19. A spar as defined in claim 14 including
filament plies extending longitudinally along said core to increase the strength of said spar.

20. The spar as defined in claim 14 wherein
said core is hollow to provide an internal storage space in said spar.

21. A spar as defined in claim 14 including
an airfoil, and
said spar comprises a load bearing member in said airfoil.

22. A spar as defined in claim 21 including
a plurality of said spars in said airfoil,
said spars being operative to provide redundant load bearing paths in said airfoil to thereby provide load bearing capability if there is physical degradation of one of said spars.

23. A spar as defined in claim 21 wherein
said airfoil is a fixed wing.

24. A spar as defined in claim 21 wherein
said airfoil is a rotary wing.

25. A spar as defined in claim 22 wherein
said airfoil is a fixed wing.

26. A spar as defined in claim 22 wherein
said airfoil is a rotary wing.

27. A spar as defined in claim 14 wherein
said filament plies include both high modulus filaments and low modulus filaments,
said high modulus filaments being wrapped in one direction and said low modulus filaments being wrapped in the opposite direction, said low modulus filaments being operative to retain the high modulus filaments in their positions without changing the location of said actual bending axis.

* * * * *